US010326589B2

(12) United States Patent
Naito

(10) Patent No.: US 10,326,589 B2
(45) Date of Patent: Jun. 18, 2019

(54) MESSAGE AUTHENTICATOR GENERATING APPARATUS, MESSAGE AUTHENTICATOR GENERATING METHOD, AND COMPUTER READABLE RECORDING MEDIUM

(71) Applicant: MITSUBISHI ELECTRIC CORPORATION, Tokyo (JP)

(72) Inventor: Yusuke Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/754,431

(22) PCT Filed: Sep. 28, 2015

(86) PCT No.: PCT/JP2015/077311
§ 371 (c)(1),
(2) Date: Feb. 22, 2018

(87) PCT Pub. No.: WO2017/056150
PCT Pub. Date: Apr. 6, 2017

(65) Prior Publication Data
US 2018/0241544 A1 Aug. 23, 2018

(51) Int. Cl.
*H04L 9/06* (2006.01)
*H04L 9/32* (2006.01)
*H04L 9/08* (2006.01)

(52) U.S. Cl.
CPC .......... *H04L 9/0618* (2013.01); *H04L 9/0869* (2013.01); *H04L 9/32* (2013.01)

(58) Field of Classification Search
CPC ........ H04L 9/0618; H04L 9/0869; H04L 9/32
See application file for complete search history.

(56) References Cited

U.S. PATENT DOCUMENTS 5,140,634 A * 8/1992 Guillou ................ G06Q 20/341
235/382
5,218,637 A * 6/1993 Angebaud ............ G06Q 20/341
705/67

(Continued)

FOREIGN PATENT DOCUMENTS

JP 2009-188794 A 8/2009
JP 2011-40932 A 2/2011

(Continued)

OTHER PUBLICATIONS

Aoki et al., "Specification of Camellia—a 128-bit Block Cipher", total of 74 pages.

(Continued)

*Primary Examiner* — Samson B Lemma
*Assistant Examiner* — Richard W Cruz-Franqui
(74) *Attorney, Agent, or Firm* — Birch, Stewart, Kolasch & Birch, LLP

(57) ABSTRACT

A message authenticator generating apparatus (10), for each integer i, taking as input a key K and a value m'[i] which is generated from a message M, calculates a value c[i] by a block cipher E. The message authenticator generating apparatus (10), taking as input the value c[i] for each integer i, calculates a value w[1], a value w[2], and a value w[3] each maintaining the randomness of the value c[i]. The message authenticator generating apparatus (10), taking as input the value w[2] and the key K, calculates a value K' by a function e which is a substitution function if the key K is fixed, taking as input the value w[1] and the value K', calculates a value c by a block cipher E, and taking as input the value w[3] and the value c, calculates an authenticator T by a function d which is a substitution function if the value w[3] is fixed.

10 Claims, 6 Drawing Sheets

(56) References Cited

U.S. PATENT DOCUMENTS

| | | | |
|---|---|---|---|
| 5,319,705 A * | 6/1994 | Halter | G06F 21/10 |
| | | | 380/277 |
| 5,651,069 A * | 7/1997 | Rogaway | H04L 9/3242 |
| | | | 380/28 |
| 5,664,016 A * | 9/1997 | Preneel | H04L 9/0643 |
| | | | 380/28 |
| 5,757,913 A | 5/1998 | Bellare et al. | |
| 8,589,688 B2 * | 11/2013 | Minematsu | H04L 9/0631 |
| | | | 380/28 |
| 2002/0051537 A1 * | 5/2002 | Rogaway | H04L 9/0643 |
| | | | 380/46 |
| 2002/0181701 A1 * | 12/2002 | Lee | H04L 9/3066 |
| | | | 380/1 |
| 2004/0223616 A1 * | 11/2004 | Kocarev | H04L 9/001 |
| | | | 380/263 |
| 2009/0138710 A1 | 5/2009 | Minematsu | |
| 2010/0169657 A1 * | 7/2010 | Ghouti | H04L 9/0643 |
| | | | 713/181 |
| 2011/0211691 A1 | 9/2011 | Minematsu | |
| 2012/0057702 A1 * | 3/2012 | Minematsu | H04L 9/0643 |
| | | | 380/255 |
| 2012/0314857 A1 | 12/2012 | Minematsu | |
| 2015/0270949 A1 * | 9/2015 | Michiels | H04L 9/14 |
| | | | 380/28 |
| 2015/0349950 A1 * | 12/2015 | Shrimpton | H04L 9/0618 |
| | | | 713/189 |
| 2016/0006568 A1 | 1/2016 | Minematsu | |
| 2018/0241544 A1 * | 8/2018 | Naito | H04L 9/0618 |

FOREIGN PATENT DOCUMENTS

| | | |
|---|---|---|
| JP | 2011-250466 A | 12/2011 |
| JP | 2011-259389 A | 12/2011 |
| WO | WO 2007/052477 A1 | 5/2007 |
| WO | WO 2009/020060 A1 | 2/2009 |
| WO | WO 2010/024004 A1 | 3/2010 |
| WO | WO 2010/131563 A1 | 11/2010 |
| WO | WO 2011/105367 A1 | 9/2011 |
| WO | WO 2014/136386 A1 | 9/2014 |

OTHER PUBLICATIONS

Black et al., "A Block-Cipher Mode of Operation for Parallelizable Message Authentication", 2002, pp. 1-17.

Federal Information Processing Standards Publication 197, Nov. 26, 2001, Announcing the Advanced Encryption Standard (AES), pp. 1-47.

International Search Report for PCT/JP2015/077311 (PCT/ISA/210) dated Nov. 24, 2015.

Matsui, "Block Encryption Algorithm MISTY", pp. 1-14

Rogaway, "Efficient Instantiations of Tweakable Blockciphers and Refinements to Modes OCB and PMAC", Sep. 24, 2004, pp. 1-28.

Yasuda, "A New Variant of PMAC: Beyond the Birthday Bound", CRYPTO 2011, LNCS 6841, pp. 596-609.

* cited by examiner

US 10,326,589 B2

MESSAGE AUTHENTICATOR GENERATING APPARATUS, MESSAGE AUTHENTICATOR GENERATING METHOD, AND COMPUTER READABLE RECORDING MEDIUM

TECHNICAL FIELD

The present invention relates to a technology of generating an authenticator for a message securely and efficiently with using a block cipher.

BACKGROUND ART

With a message authentication algorithm, when messages are exchanged between two parties, a recipient can confirm whether or not a sent message has been tampered with.

When tampering is to be detected using the message authentication algorithm, a key K is shared by the two parties in advance. The sender of the message generates an authenticator T for a message M from the message M and the key K, and sends the message M and the authenticator T to the recipient. The recipient of the message generates an authenticator T' from the received message M and the key K. If the received authenticator T and the generated authenticator T' agree, the recipient judges that the message M has not been tampered with. If the authenticator T and the authenticator. T' do not agree, the recipient judges that the message has been tampered with.

The security of the message authentication algorithm is expressed by the indistinguishability from a random function.

Assume that a message authentication algorithm F satisfies the indistinguishability. This means that, considering a distinguisher D who interacts with either the real world or the ideal world, which world the distinguisher D interacts with cannot be guessed.

In the real world, the key K is randomly chosen, and the distinguisher D can choose the message M and obtain a message authenticator of F(K, M). In the ideal world, for a random function R, the distinguisher D can choose the message M and obtain an output value of R(M). Here, the distinguisher D can choose the message M as often as he or she wishes, and can obtain an output value of F(K, M) or R(M) corresponding to the chosen message M.

More precisely, consider a distinguisher D who outputs a 1-bit value. The indistinguishability of the message authentication algorithm F is assessed from the difference between the probability that the distinguisher D outputs 1 in the real world and the probability that the distinguisher D outputs 1 in the ideal world.

The distinguisher D can obtain a plurality of outputs from the message authentication algorithm F in the real world, and can obtain a plurality of outputs from the random function R in the ideal world. In this case, if the difference between the above-mentioned probabilities is equal to or less than p for any distinguisher D and p is a negligibly small value, the message authentication algorithm F satisfies the indistinguishability. This p is called distinction probability.

A block cipher E, taking as input a k-bit key K and an n-bit plaintext m, outputs an n-bit ciphertext c. That is, c=E(K, m). Note that k n hereinbelow. The block cipher E is a substitution function having an n-bit input/output length if the key is fixed.

Non-Patent Literatures 4 to 6 describe block cipher.

There is a block-cipher based message authentication algorithm. With the block-cipher based message authentication algorithm, a message M is divided into message blocks at every n bits, and block cipher calculation is carried out for each divided message block.

The efficiency of the block-cipher based message authentication algorithm is influenced by the number of calls, the parallelism, and the key size explained below.

The number of calls: The efficiency changes depending on how many times the block cipher is called in order to calculate the n-bit message block. When the block cipher is to be called x times for the n-bit message block, 1/x is called a rate. The closer to 1 the rate is, the smaller the number of block cipher calls, providing a high efficiency.

Parallelism: Where parallel algorithm processing is possible, the calculation time can be shortened by performing computations by hardware or a multicore in a parallel manner, providing a high efficiency.

Key size: The key size of the message authentication algorithm changes depending on how many inner block-cipher keys are employed. The key size is the smallest when only one block cipher key K is employed, that is, when the processing is performed using only one k-bit key K.

In assessing the distinction probability of the block-cipher based message authentication algorithm, it is supposed that the block cipher is an ideal block cipher, or a block cipher E(K, ·) with the key K being fixed is a random substitution.

The distinction probability p is obtained from a size n being the bit count of the ciphertext c of the block cipher E, the number q of outputs from the message authentication algorithm available to the distinguisher D, and a value bmax obtained by dividing the maximum length of the input message to the message algorithm by n. Where the maximum length of the input message is expressed as lmax in bit, bmax=lmax/n. The security of the message authentication algorithm is assessed from the value of bmax×q with which p=1. The larger the value of bmax×q, the more secure the algorithm is.

Non-Patent Literatures 1 and 2 each describe a block-cipher based message authentication algorithm which has a k-bit key-size, is parallel-processing possible, and provides a rate of 1.

It is indicated that the message authentication algorithm described in Non-Patent Literature 1 provides p=(bmax× q)$^2$/2$^n$ if the block cipher E with the key K being fixed is replaced by a random substitution. That is, if bmax×q=2$^{n/2}$, p=1.

Non-Patent Literature 3 describes a block-cipher based message authentication algorithm whose security is improved over Non-Patent Literatures 1 and 2. The message authentication algorithm described in Non-Patent Literature 3 employs 3 (three) k-bit keys, and thus has a 3 k-bit key size, is parallel-processing possible, and provides a rate of 1.

It is indicated that the message authentication algorithm described in Non-Patent Literature 3 provides p=(bmax× q)$^3$/2$^{2n}$ if the block cipher E with the key K being fixed is replaced by a random substitution. That is, if bmax×q=2$^{2n/3}$, p=1.

CITATION LIST

Patent Literature

Non-Patent Literature

Non-Patent Literature 1: John Black and Phillip Rogaway. A Block-Cipher Mode of Operation for Parallelizable Message Authentication. EUROCRYPT 2002. p384-397.

Non-Patent Literature 2: Phillip Rogaway. Efficient Instantiations of Tweakable Blockciphers and Refinements to Modes OCB and PMAC. ASIACRYPT 2004. p16-31.

Non-Patent Literature 3: Kan Yasuda. A New Variant of PMAC: Beyond the Birthday Bound. CRYPTO 2011. p596-609.

Non-Patent Literature 4: AES—Advanced Encryption Standard—FIPS PUB 197.

Non-Patent Literature 5: Camellia http://www.cryptrec.go.jp/cryptrec_03_spec_cypherlist_files/PDF/06_01jspec.pdf Non-Patent Literature 6: MISTY1 http://www.mitsubishielectric.co.jp/corporate/randd/information_technology/security/code/pdf/misty_j.pdf

SUMMARY OF INVENTION

Technical Problem

The message authentication algorithm described in Non-Patent Literature 3 provides a higher security than the message authentication algorithms described in Non-Patent Literatures 1 and 2 but has a larger key size.

The present invention has as its objective to enable implementation of a block-cipher based message authentication algorithm that does not degrade the efficiency while providing a higher security than the message authentication algorithm described in Non-Patent Literature 1.

Solution to Problem

A message authenticator generating apparatus according to the present invention includes:

a randomizing unit to, for each integer i of i=1, ..., b, taking as input a k-bit key K and an n-bit value m'[i] which is generated from a message M, calculate an n-bit value c[i] having randomness by a block cipher;

a compressing unit to, taking as input the value c[i] for each integer i of i=1, ..., b, calculate an n-bit value w[1], a k-bit value w[2], and an n-bit value w[3] each maintaining the randomness of the value c[i]; and an authenticator generating unit to, taking as input the value w[2] and the key K, calculate a k-bit value K' by a function e which is a substitution function if the key K is fixed, taking as input the value w[1] and the value K', calculate an n-bit value c by a block cipher, and taking as input the value w[3] and the value c, calculate an authenticator T of the message M by a function d which is a substitution function if the value w[3] is fixed.

Advantageous Effects of Invention

The present invention can implement a message authentication algorithm which, while providing a higher security than the message authentication algorithm described in Non-Patent Literature 1, has an efficiency of the same level as that of Non-Patent Literature 1.

DESCRIPTION OF EMBODIMENTS

Embodiment 1

*Explanation of Configuration*

Figure 1:
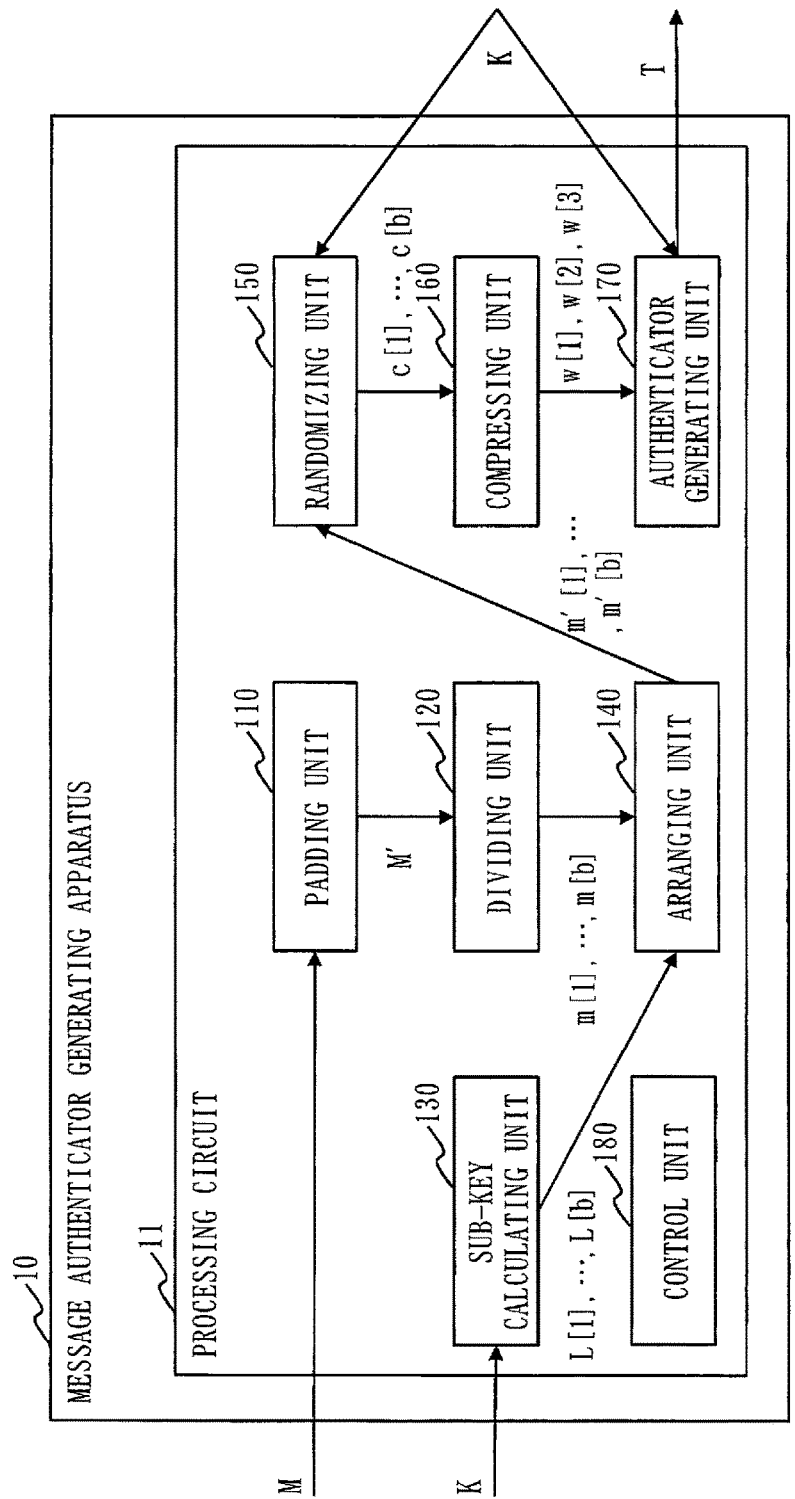
FIG. 1 is a configuration diagram of a message authenticator generating apparatus 10 according to Embodiment 1.

FIG. 1 is a configuration diagram of a message authenticator generating apparatus 10 according to Embodiment 1.

The message authenticator generating apparatus 10 is provided with a processing circuit 11. The processing circuit 11 is a dedicated electronic circuit that implements the features of a padding unit 110, a dividing unit 120, a sub-key calculating unit 130, an arranging unit 140, a randomizing unit 150, a compressing unit 160, an authenticator generating unit 170, and a control unit 180.

It is assumed that the processing circuit 11 is a single circuit, a multiple circuit, a programmed processor, a parallel-programmed processor, a logic IC, a GA, an ASIC, a GA, an ASIC, or an FPGA. GA is an abbreviation for Gate Array. ASIC is an abbreviation for Application Specific Integrated Circuit. FPGA is an abbreviation for Field-Programmable Gate Array.

The features may be implemented by the single processing circuit 11, or may be implemented by a plurality of processing circuits 11 in a distributed manner.

Information, data, signal values, and variable values representing the results of the processes of the features implemented by the processing circuit 11 are stored in a memory area such as a register in the processing circuit 11.

*Explanation of Operation*

Figure 2:
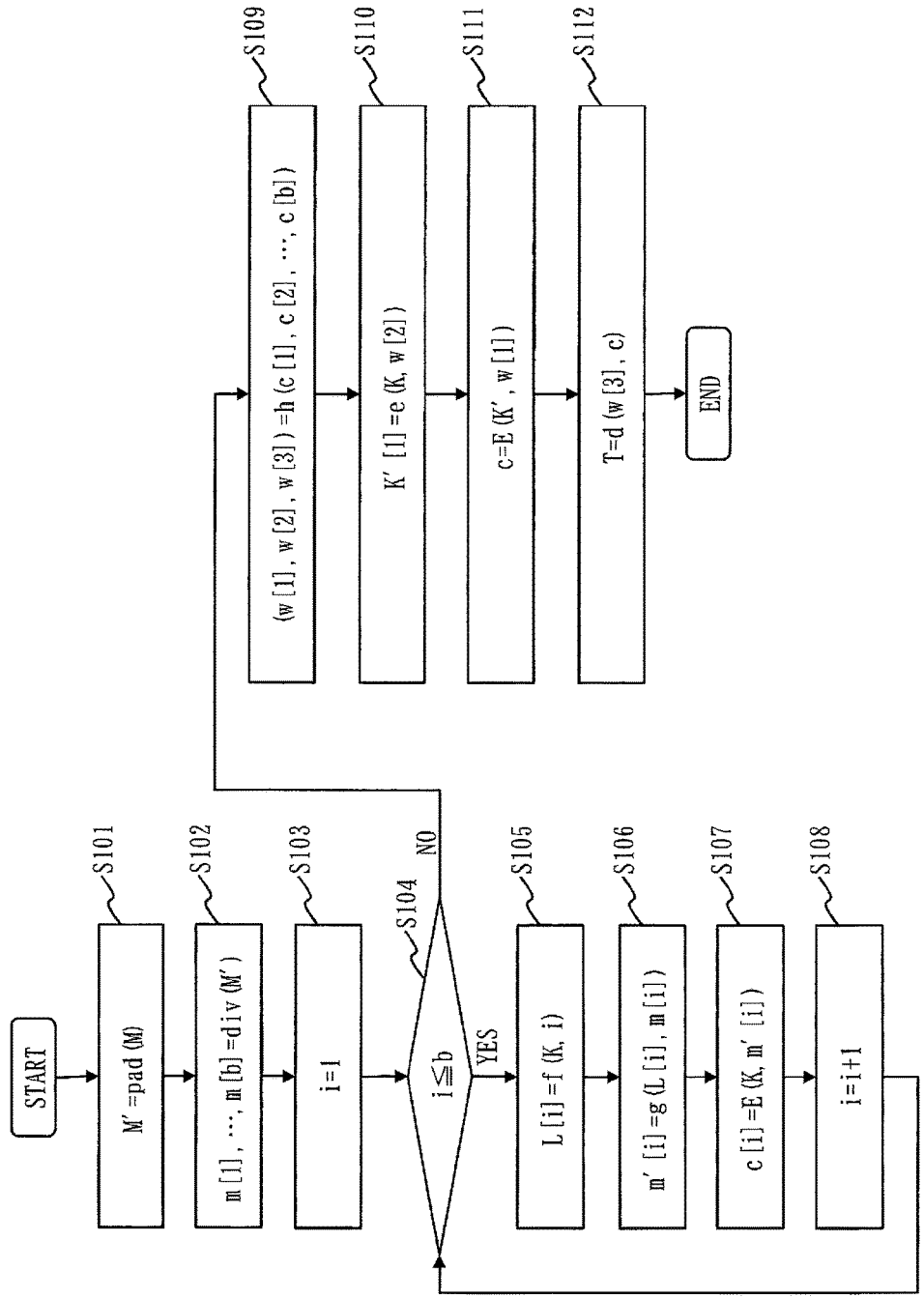
FIG. 2 is a flowchart illustrating an operation of the message authenticator generating apparatus 10 according to Embodiment 1.

FIG. 2 is a flowchart illustrating an operation of the message authenticator generating apparatus 10 according to Embodiment 1.

Figure 3:
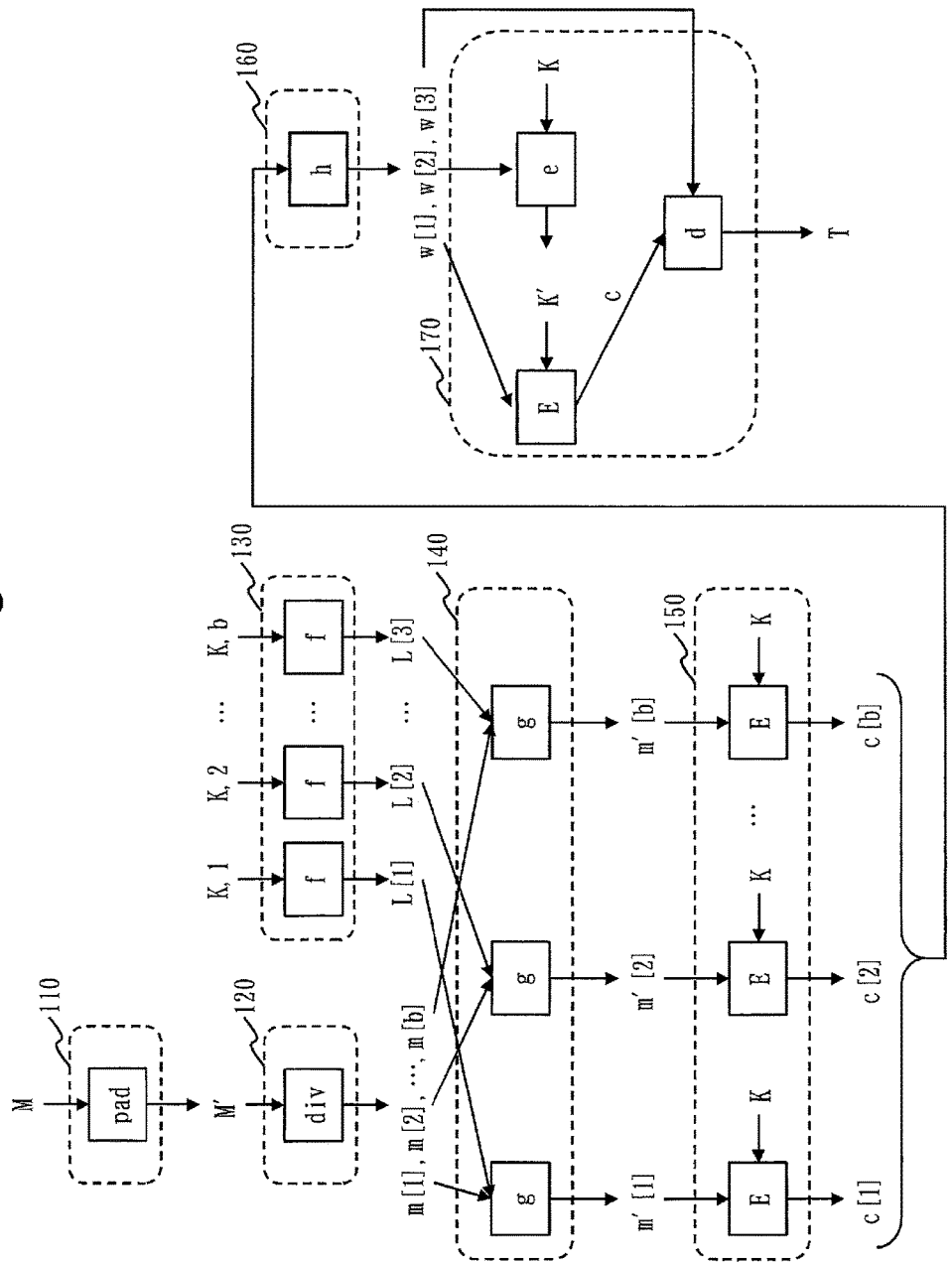
FIG. 3 is a configuration diagram of a message authentication algorithm implemented by the message authenticator generating apparatus 10 according to Embodiment 1.

FIG. 3 is a configuration diagram of a message authentication algorithm implemented by the message authenticator generating apparatus 10 according to Embodiment 1. Processes surrounded by broken lines in FIG. 3 are implemented by the features denoted by the reference numerals attached to the broken lines.

The operation of the message authenticator generating apparatus 10 according to Embodiment 1 corresponds to a message authenticator generating method according to Embodiment 1. The operation of the message authenticator generating apparatus 10 according to Embodiment 1 also corresponds to the processing of a message authenticator generating program according to Embodiment 1.

In a padding process of step S101, the padding unit 110, taking as input an arbitrary-length message M, generates a b-times-n-bit value M' by an injective function pad where b is an integer equal to or grater than 1.

In a dividing process of step S102, the dividing unit 120, taking as input the value M' generated in step S101, divides the value M' at every n bits from its head to generate a value $m[i]$ for each integer i of i=1 ..., b. Namely, M'= $m[^1]\|m[^2]\|\ldots\|m[b]$ where $\|$ signifies concatenation of bit strings.

In the variable setting process of step S103, the control unit 180 sets in a variable i, 1 as an initial value.

In a variable determining process of step S104, the control unit 180 determines whether the variable i is equal to or smaller than b, or not. If the variable i is equal to or smaller than b (YES in step S104), the control unit 180 proceeds to the process of step S105. If the variable i is greater than b (NO in step S104), the control unit 180 proceeds to the process of step S109.

In a sub-key calculating process of step S105, the sub-key calculating unit 130, taking as input a key K and the variable i, calculates an n-bit sub-key L[i] by a function f.

In an arranging process of step S106, the arranging unit 140, taking as input the value m[i] generated in step S102 and the sub-key L[i] generated in step S105, calculates an n-bit value m'[i] by a function g which is a substitution function if the sub-key L[i] is fixed.

In a randomizing process of step S107, the randomizing unit 150, taking as input the k-bit key K and the n-bit value m'[i] which is generated in step S106 for the variable i, calculates an n-bit value c[i] having randomness.

The block cipher E is a block cipher function which, taking as input the k-bit key K and an n-bit plaintext m, outputs an n-bit ciphertext c having randomness. The block cipher E used in computation for each variable i may be identical or different.

In a variable addition process of step S108, the control unit 180 adds 1 to the variable i. Then, the control unit 180 returns to the process of step S104.

That is, in step S105, the sub-key calculating unit 130, by taking as input the key K and the integer i, calculates the sub-key L[i] for each integer i of i=1, . . . , b by the function f.

In step S106, the arranging unit 140 uses the n-bit value m[i] for each integer i of i=1, . . . , b which is generated from the message M, and the n-bit sub-key L[i] for each integer i of i=1 . . . , b which is generated from the key K. Then, the arranging unit 140, taking as input the value m[i] and the sub-key L[i], calculates the value m'[i] for each integer i of i=1, . . . , b by the function g which is a substitution function if the sub-key L[i] is fixed.

In step S107, the randomizing unit 150, taking as input the k-bit key K and the n-bit value m'[i] which is generated from the message M, calculates the n-bit value c[i] having randomness for each integer i of i=1, . . . , b, by the block cipher E.

Subsequently, in a compressing process of step S109, the compressing unit 160, taking as input a value c[i] for each integer i of i=1, . . . , b, calculates an n-bit value w[1], a k-bit value w[2], and an n-bit value w[3] each maintaining the randomness of the value c[i], by a function h.

The compressing unit 160 may calculate the value w[1], the k-bit value w[2], and the n-bit value w[3] by taking as input the message M in addition to the value c[i] for each integer i of i=1, . . . , b.

In a key converting process of step S110, the authenticator generating unit 170, taking as input the key K and the value w[2] which is calculated in step S109, calculates a k-bit value K' by a function e which is a substitution function if the key K is fixed.

In an encrypting process of step S111, the authenticator generating unit 170, taking as input the value w[1] calculated in step S109 and the value K' calculated in step S110, calculates an n-bit value c by the block cipher E.

The block cipher E used in computation of step S111 may be a function that is identical with or different from the block cipher E used in the computation of step S107.

In an authenticator calculating process of step S112, the authenticator generating unit 170, taking as input the value w[3] calculated in step S109 and the value c calculated in step S111, calculates an n-bit value T' by a function d which is a substitution function if the value w[3] is fixed. The authenticator generating unit 170 treats t bits out of the n-bit value T' as the authenticator T of the message M. Any t bits of any portion may be extracted out of the value T' and treated as the authenticator T where t≤n.

The processes of step S110 through step S112 form an authenticator generating process.

Effect of Embodiment 1

As described above, the message authenticator generating apparatus 10 according to Embodiment 1 implements a block-cipher based message authentication algorithm.

In particular, the message authentication algorithm implemented by the message authenticator generating apparatus 10 according to Embodiment 1 uses, as the key, only one k-bit key K. Hence, this message authentication algorithm has a k-bit key size. The message authentication algorithm can execute some processes for each integer i of i=1, . . . , b in a parallel manner. The message authentication algorithm is of rate 1 as it calls the block cipher only once with respect to an n-bit message block.

Namely, the message authentication algorithm implemented by the message authenticator generating apparatus 10 according to Embodiment 1 can have a k-bit key size, is parallel-processing possible, and can provide a rate of 1.

The message authentication algorithm implemented by the message authenticator generating apparatus 10 according to Embodiment 1 has a security of $p=(b_{max} \times q)/2^n$ under the following conditions: the block cipher E is an ideal block cipher, the output of the function f with the key K being fixed is indistinguishable from a random number if $b_{max} \times q < 2^n$, and the output of the function h is indistinguishable from a random number if $b_{max} \times q < 2^n$.

Namely, the message authentication algorithm implemented by the message authenticator generating apparatus 10 according to Embodiment 1 provides p=1 when $b_{max} \times q = 2^n$.

*Other Configuration*

In the above description, the message authenticator generating apparatus 10 is provided with the processing circuit 11 being a dedicated electronic circuit that implements the features. The features are those of the padding unit 110, dividing unit 120, sub-key calculating unit 130, arranging unit 140, randomizing unit 150, compressing unit 160, authenticator generating unit 170, and control unit 180. Alternatively, the features may be implemented by software.

Figure 4:
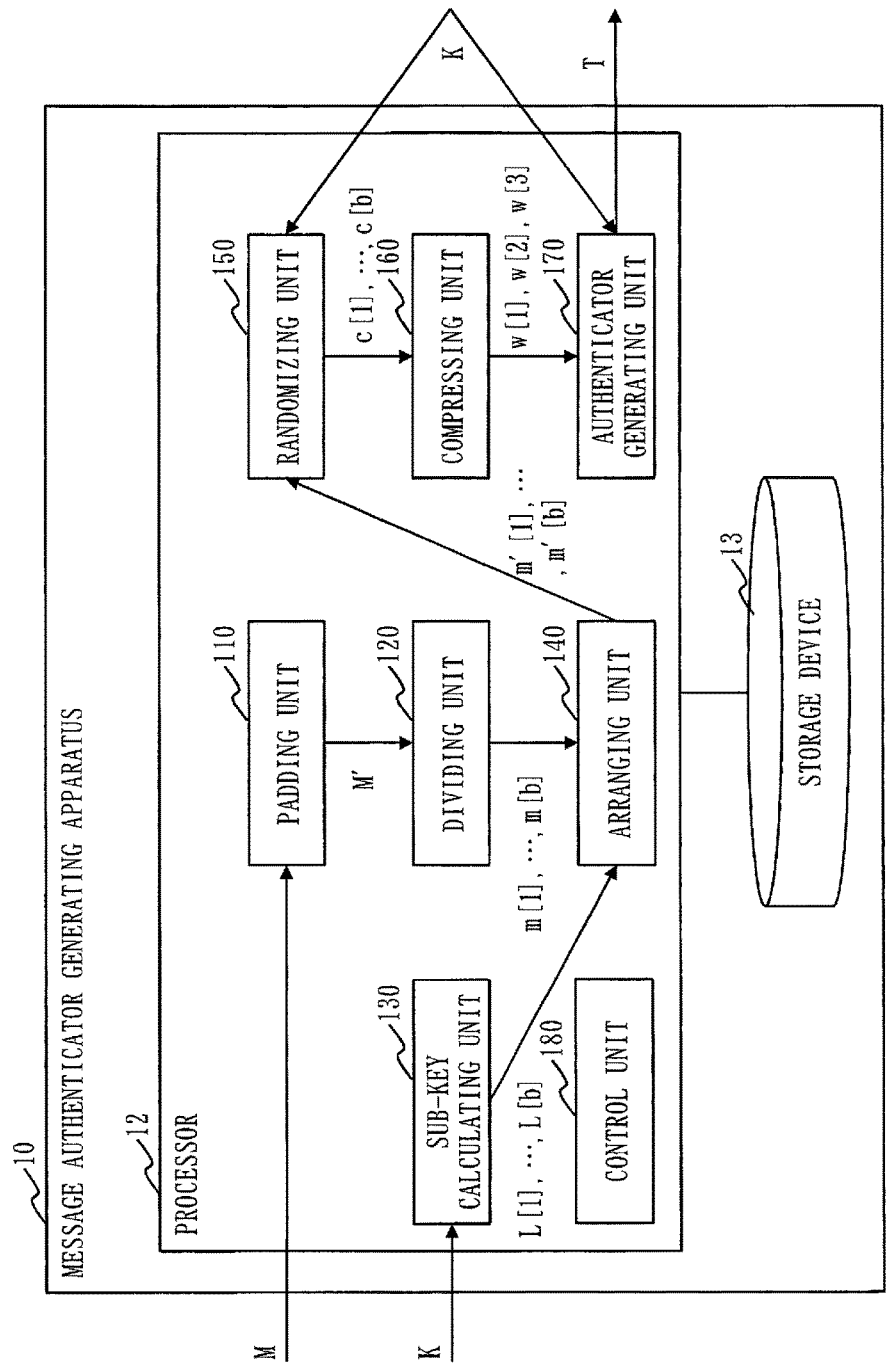
FIG. 4 is a configuration diagram of the message authenticator generating apparatus 10 whose features are implemented by software.

FIG. 4 is a configuration diagram of the message authenticator generating apparatus 10 whose features are implemented by software.

The message authenticator generating apparatus 10 is a computer.

The message authenticator generating apparatus 10 is provided with hardware devices which are a processor 12 and a storage device 13. The processor 12 is connected to the above other hardware devices and controls them.

A program that implements the features is stored in the storage device 13. The program is read by the processor 12 and executed by the processor 12.

The processor 12 is an IC which performs processing. IC is an abbreviation for Integrated Circuit. The processor 12 is specifically a CPU, a DSP, or a GPU. CPU is an abbreviation for Central Processing Unit. DSP is an abbreviation for Digital Signal Processor. GPU is an abbreviation for Graphics Processing Unit.

The storage device 13 is specifically a ROM, a RAM, a flash memory, or an HDD. ROM is an abbreviation for Read Only Memory. RAM is an abbreviation for Random Access Memory. HDD is an abbreviation for Hard Disk Drive.

Information, data, signal values, and variables values indicating the results of the processes of the features implemented by the processor 12 are stored in the storage device 13 or a memory area in the processor 12 such as a register or cache memory.

In the above description, the program that implements the features implemented by the processor 12 is stored in the storage device 13. Alternatively, this program may be stored in a portable storage medium such as a magnetic disk, a flexible disk, an optical disc, a compact disk, a blu-ray (registered trademark) disk, or a DVD.

FIG. 4 illustrates only one processor 12. Alternatively, a plurality of processors 12 may be provided. The plurality of processors 12 may cooperate with each other to execute the program that implements the features.

Some features may be implemented by hardware and the other features may be implemented by software. The features may be implemented by firmware.

The processing circuit 11, the processor 12, and the storage device 13 will be collectively referred to as "processing circuitry". That is, the features are implemented by the processing circuitry.

Each "unit" in the above description may be rephrased as a "stage", a "procedure", or a "process".

Embodiment 2

In Embodiment 2, a configuration in which the functions in Embodiment 1 are put into specific shapes will be described.

In Embodiment 2, differences from Embodiment 1 will be described.

An operation of a message authenticator generating apparatus 10 according to Embodiment 2 will be described with reference to FIG. 2.

Figure 5:
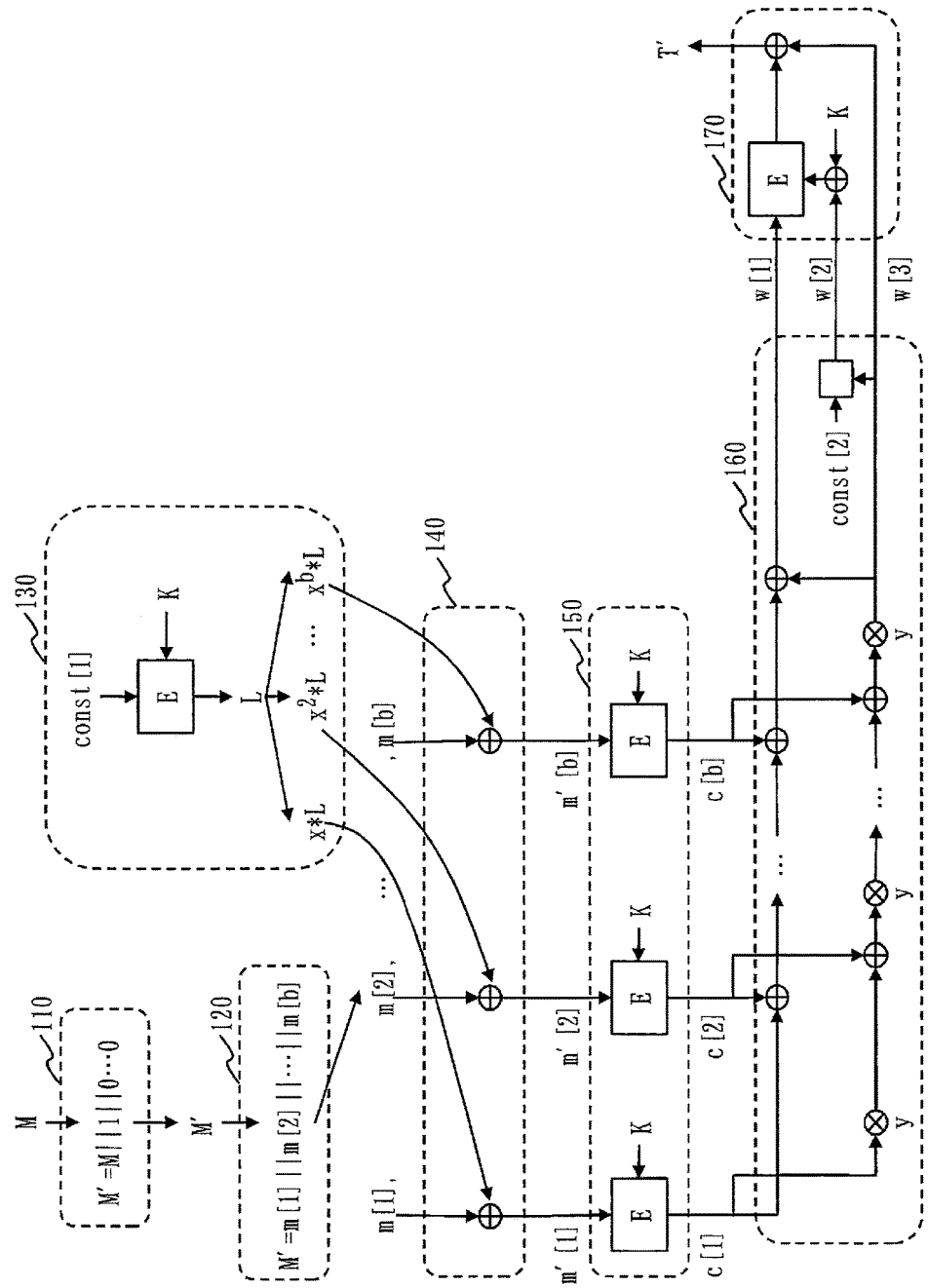
FIG. 5 is a configuration diagram of a message authentication algorithm implemented by a message authenticator generating apparatus 10 according to embodiment 2.

FIG. 5 is a configuration diagram of a message authentication algorithm implemented by the message authenticator generating apparatus 10 according to embodiment 2. As in FIG. 3, processes surrounded by broken lines in FIG. 5 are implemented by the features denoted by reference numerals attached to the broken lines.

The operation of the message authenticator generating apparatus 10 according to Embodiment 2 corresponds to a message authenticator generating method according to Embodiment 2. The operation of the message authenticator generating apparatus 10 according to Embodiment 2 corresponds to the processing of a message authenticator generating program according to Embodiment 2.

In a padding process of step S101, a padding unit 110, taking as input a message M, generates a value M' by a function pad. In this process, the padding unit 110 generates the value M' having a b-times-n-bit length by adjoining 1 to the end of the message M and adding a bit string of 0 to follow 1. The number of 0s to adjoin is 0 or more which is at the same time the minimum number with which the value M' is a multiple of n. The padding unit 110 may inverse 1 and 0, adjoin 0 to the end of the message M, and adjoin a bit string of 1 to follow 0.

The processes of step S102 through step S104 are the same as those in Embodiment 1 and their description will accordingly be omitted.

In a sub-key calculating process of step S105, a sub-key calculating unit 130, taking as input a key K and the variable i, calculates an n-bit sub-key L[i] by a function f. In this process, first, the sub-key calculating unit 130, taking as input an n-bit fixed value const[1] and the key K, calculates an n-bit value L by a block cipher E. Then, using a value x, the sub-key calculating unit 130 calculates (L×$x^i$) for the valuable i and treats the result as the sub-key L[i].

If N=$2^n$, the multiplication in this process is a multiplication over a Galois field consisting of N elements. The value x is an element over the Galois field and has a property that x, $x^2$, . . . , and $x^{N-1}$ will all have different values. L[i] can be expressed by an n-bit value. The value $x^i$ is a value obtained by multiplying i times the value x over the Galois field.

The block cipher E employed in the computation of step S105 may be a function that is identical with or different from the block cipher E employed in the computation of step S107 and step S111.

In an arranging process of step S106, an arranging unit 140, taking as input a value m[i] generated in step S102 and the sub-key L[i] generated in step S105, calculates a value m'[i] by a function g. In this process, the arranging unit 140 calculates the value m'[i] by calculating an exclusive OR of the sub-key L[i] and the value m[i].

The processes of step S107 through step S108 are the same as those in Embodiment 1, and their description will accordingly be omitted.

In a compressing process of step S109, a compressing unit 160, taking as input a value c[i] for each integer i of i=1, . . . , b, calculates an n-bit value w[1], a k-bit value w[2], and an n-bit value w[3] by a function h.

In this process, first, the compressing unit 160, using a value y, calculates an exclusive OR of (c[i]×$y^{b-(i-1)}$) for each integer i of i=1, . . . , b, and treats the result as a value w. Then, the compressing unit 160 calculates an exclusive OR of the value w and a value c[i] for each integer i of i=1, . . . , b, and treats the result as the value w[1]. The compressing unit 160 also concatenates a (k−n)-bit fixed value const[2] to the value w, and treats the result as the value w[2]. The compressing unit 160 also treats the value w as the value w[3].

More specifically, first, the compressing unit 160 calculates w=(c[1]×$y^b$) xor (c[2]×$y^{b-1}$) xor xor (c[b−1]×$y^2$) xor (c[b]×y). Then, the compressing unit 160 calculates w[1]=c[1] xor c[2] xor . . . xor c[b−1] xor c[b] xor w. Also, the compressing unit 160, using the (k−n)-bit fixed value const[2], calculates w[2]=w∥const[2]. The compressing unit 160 also treats w[3] as w[3]=w.

If N=$2^n$, the multiplication in this process is a multiplication over a Galois field consisting of N elements. The value y is an element over the Galois field and has a property that y, $y^2$, . . . , and $y^{N-1}$ will all have different values. Note that w can be expressed by an n-bit value. The value $y^i$ is a value obtained by multiplying i times the value y over the Galois field.

In the calculation of the value w[2], const[2] may be adjoined to a position other than the position that follows w.

In a key converting process of step S110, an authenticator generating unit 170, taking as input the key K and the value w[2] which is calculated in step S109, calculates a k-bit value K' by a function e. In this process, the authenticator generating unit 170 calculates the value K' by calculating the exclusive OR of the value w[2] and the key K.

The process of step S111 is the same as those in Embodiment 1, and its description will accordingly be omitted.

In an authenticator calculating process of step S112, the authenticator generating unit 170, taking as input the value w[3] calculated in step S109 and the value c calculated in step S111, calculates an authenticator T of the message M by a function d. In this process, the authenticator generating unit 170 calculates a value T' by calculating an exclusive OR of the value w[3] and the value c, and treats t bits out of the value T' as the authenticator T. Any t bits of any portion may be extracted out of the value T' and treated as the authenticator T.

The Galois field employed in the function f of step S105 and the Galois field employed in the function h of step S109 may be identical or different.

Effect of Embodiment 2

As described above, the message authenticator generating apparatus 10 according to Embodiment 2 implements a block-cipher based message authentication algorithm.

The message authentication algorithm implemented by the message authenticator generating apparatus 10 according to Embodiment 2 has a k-bit key size, is parallel-processing possible, and provides a rate of 1. With the message authentication algorithm implemented by the message authenticator generating apparatus 10 according to Embodiment 2, $p=1$ if $bmax \times q = 2^n$ under the conditions described in Embodiment 1.

Embodiment 3

In the configuration described in Embodiment 2, even when the message M has multiple-of-n bits, bits are adjoined to the message M by the padding unit 110. In Embodiment 3, if the message M has multiple-of-n-bits, no bit is adjoined to the message M. This is where Embodiment 3 is different from Embodiment 2.

In Embodiment 3, differences from Embodiment 2 will be described.

An operation of a message authenticator generating apparatus 10 according to Embodiment 3 will be described with reference to FIG. 2.

Figure 6:
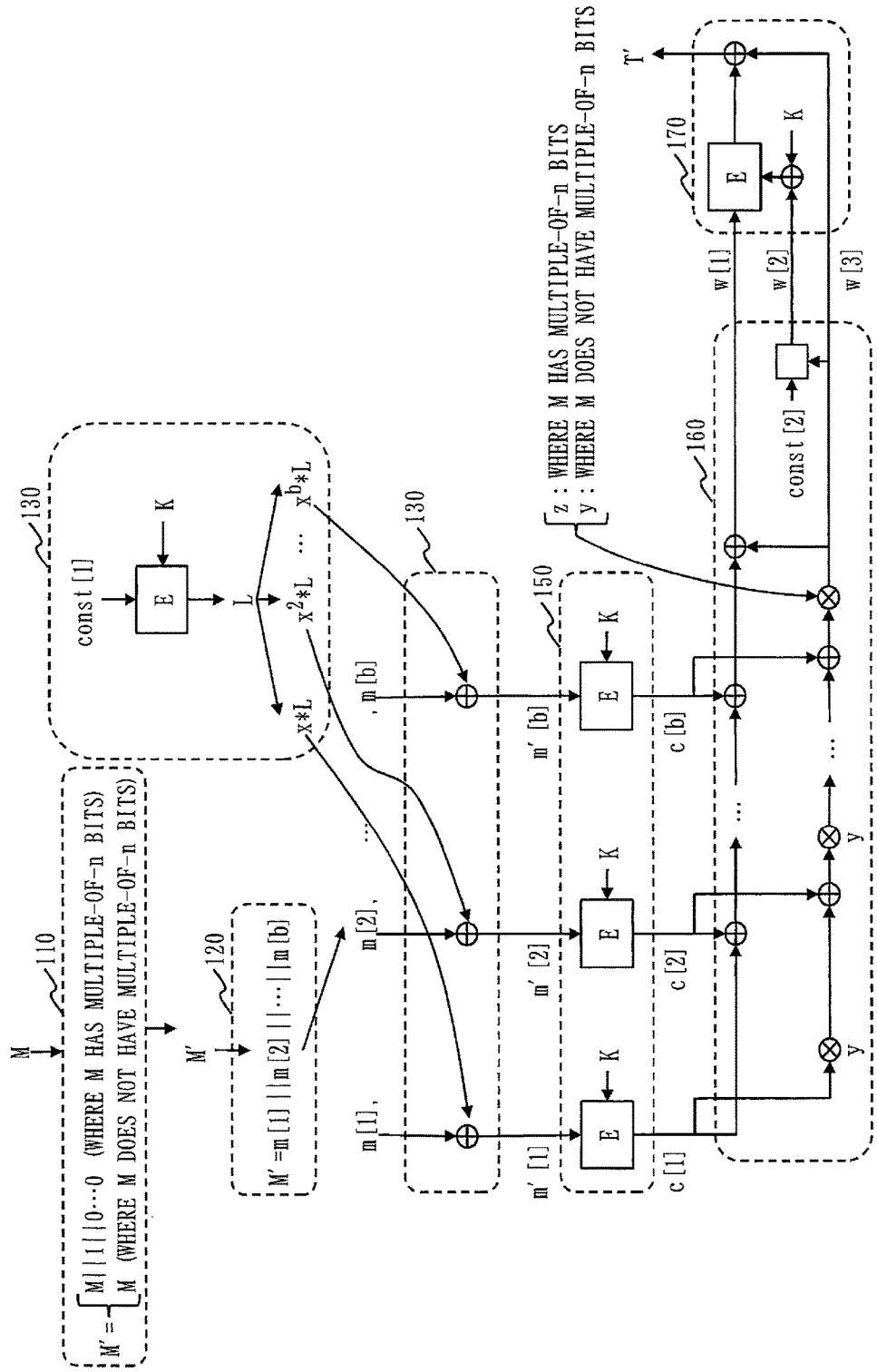
FIG. 6 is a configuration diagram of a message authentication algorithm implemented by a message authenticator generating apparatus 10 according to embodiment 3.

FIG. 6 is a configuration diagram of a message authentication algorithm implemented by the message authenticator generating apparatus 10 according to Embodiment 3. As in FIG. 5, processes surrounded by broken lines in FIG. 6 are implemented by features denoted by reference numerals attached to the broken lines.

The operation of the message authenticator generating apparatus 10 according to Embodiment 3 corresponds to a message authenticator generating method according to Embodiment 3. The operation of the message authenticator generating apparatus 10 according to Embodiment 3 corresponds to the processing of a message authenticator generating program according to Embodiment 3.

In a padding process of step S101, a padding unit 110, taking as input a message M, generates a value M' by a function pad.

In this process, if the message M does not have multiple-of-n bits, the padding unit 110 generates the value M' having a b-times-n-bit length by adjoining 1 to the end of the message M and adjoining a bit string of 0 to follow 1. The number of 0s to adjoin is 0 or more which is at the same time the minimum number with which the value M' is a multiple of n. The padding unit 110 may adjoin 0 to the end of the message M, and adjoin a bit string of 1 to follow 0.

If the message M has multiple-of-n bits, the padding unit 110 treats the message M as it is, as the value M'.

The processes of step S102 through step S108 are the same as those in Embodiment 2, and their description will accordingly be omitted.

In a compressing process of step S109, a compressing unit 160, taking as input a value c[i] for each integer i of $i = 1, \ldots, b$, calculates an n-bit value w[1], a k-bit value w[2], and an n-bit value w[3] by a function h.

In this process, first, if the message M has multiple-of-n bits, the compressing unit 160, using values y and z, calculates an exclusive OR of $(c[i] \times z \times y^{b-1})$ for each integer i of $i=1, \ldots, b$, and treats the result as a value w. If the message M does not have multiple-of-n bits, the compressing unit 160, using the value y, calculates an exclusive OR of $(c[i] \times y^{b-(i-1)})$ for each integer i of $i=1, \ldots, b$, and treats the result as the value w.

Then, the compressing unit 160 calculates an exclusive OR of the value w and the value c[i] for each integer i of $i=1, \ldots, b$, and treats the result as the value w[1]. The compressing unit 160 also concatenates a (k−n)-bit fixed value const[2] to the value w, and treats the result as the value w[2]. The compressing unit 160 also treats the value w as the value w[3].

More specifically, first, if the message M has multiple-of-n bits, the compressing unit 160 calculates $w = (c[1] \times z \times y^{b-1})$ xor $(c[2] \times z \times y^{b-2})$ xor . . . xor $(c[b-1] \times z \times y)$ xor $(c[b] \times z)$. If the message M does not have multiple-of-n bits, the compressing unit 160 calculates $w = (c[1] \times y^b)$ xor $(c[2] \times y^{b-1})$ xor . . . xor $(c[b-1] \times y^2)$ xor $(c[b] \times y)$. Then, the compressing unit 160 calculates w[1]=c[1] xor c[2] xor . . . xor c[b−1] xor c[b] xor w. Also, the compressing unit 160, using the (k−n)-bit fixed value const[2], calculates w[2]=w∥const[2]. The compressing unit 160 also treats w[3] as w[3]=w.

If $N=2^n$, the multiplication in this process is a multiplication over a Galois field consisting of N elements. The values y and z are elements over the Galois field and have a property that $y, y^2, \ldots, y^{bmax}, z, z \times y, z \times y^2, \ldots, z \times y^{bmax-1}$ will all have different values. Note that w can be expressed by an n-bit value. The value $y^i$ is a value obtained by multiplying i times the value y over the Galois field.

The calculation method of the value w may be inverted between the case where the message M has multiple-of-n bits and the case where the message M does not have multiple-of-n bits. In the calculation of the value w[2], const[2] may be adjoined to a position other than the position that follows w.

The processes of step S110 through step S112 are the same as those in Embodiment 2, and their description will accordingly be omitted.

Effect of Embodiment 3

As described above, the message authenticator generating apparatus 10 according to Embodiment 3 implements a block-cipher based message authentication algorithm. If the message M has multiple-of-n bits, the message authentication algorithm implemented by the message authenticator generating apparatus 10 according to Embodiment 3 does not adjoin a bit to the message M. Therefore, the length of bits inputted in the processes of step S102 and onward is short, so that the processing speed can be increased.

When the message authentication algorithm satisfies indistinguishability security, it can be used as a pseudo-random number generation algorithm. The pseudo-random number generation algorithm is used as a function employed in Key Derivation Function or a stream cipher.

REFERENCE SIGNS LIST

10: message authenticator generating apparatus; 11: processing circuit; 12: processor; 13: storage device; 110: padding unit; 120: dividing unit; 130: sub-key calculating unit; 140: arranging unit; 150: randomizing unit; 160: compressing unit; 170: authenticator generating unit; 180: control unit

The invention claimed is:

1. A message authenticator generating apparatus for performing block-cipher based message authentication having k-bit key size and calling a block cipher only once with respect to an n-bit message block, the apparatus comprising:
processing circuitry configured to
generate, for each integer i of i=1, . . . , b, an n-bit ciphertext c[i] having randomness using a block cipher function E taking as input a k-bit key K and an n-bit value m'[i] which is generated from a message M,
generate an n-bit value w[1], a k-bit value w[2], and an n-bit value w[3] each maintaining the randomness of the value c[i], using a function h taking as input the value c[i] for each integer i of i=1, . . . , b, and
generate a k-bit value K' using a function e, which is a substitution function when the k-bit key K is fixed, taking as input the value w[2] and the key K,
generate an n-bit value c using the block cipher function E taking as input the value w[1] and the k-bit value K', and
generate an authenticator T using a function d, which is a substitution function when the value w[3] is fixed, taking as input the value w[3] and the value c, the authenticator T authenticating the message M.

2. The message authenticator generating apparatus according to claim 1, wherein to generate the n-bit value w[1], the k-bit value w[2], and the n-bit value w[3] the processing circuitry is configured to,
calculate a value w by performing an exclusive OR of $(c[i] \times y^{b-(i-1)})$ for each integer i of i=1, . . . , b, where y is a value, and
generate the n-bit value w[1] by performing an exclusive OR of the value w and the value c[i] for each integer i of i=1, . . . , b,
generate the k-bit value w[2] by concatenating a (k−n)-bit fixed value const[2] to the value w, and
treat the value w as the value w[3].

3. The message authenticator generating apparatus according to claim 1, wherein to generate the n-bit value w[1], the k-bit value w[2], and the n-bit value w[3], the processing circuitry is configured to
calculate a value w, in one of a case where the message M has multiple-of-n bits and a case where the message M does not have multiple-of-n bits, by performing an exclusive OR of $(c[i] \times y^{b-(i-1)})$ for each integer i of i=1, . . . , b, where y is a value, and
calculate the value w, in a remaining case, by performing exclusive OR of $(c[i] \times z \times y^{b-i})$ for each integer i of i=1, . . . , b, where y is a value and z is a value, and
generate the n-bit value w[1] by performing an exclusive OR of the value w and the value c[i] for each integer i of i=1, . . . , b,
generate the k-bit value w[2] by concatenating a (k−n)-bit fixed value const[2] to the value w, and
treat the value w as the value w[3].

4. The message authenticator generating apparatus according to claim 1, wherein the processing circuitry is further configured to
calculate a value m'[i], for each integer i of i=1, . . . , b, using a function g, which is a substitution function when a sub-key L[i] is fixed, taking a input a value m[i] and the sub-key L[i], where the n-bit value m[i] is generated from the message M for each integer i of i= 1, . . . , b and the n-bit sub-key L[i] is generated from the key K for each integer i of i=1, . . . , b.

5. The message authenticator generating apparatus according to claim 4, wherein the processing circuitry is further configured to
generate a b-times-n-bit value M' using an injective function pab taking as input the message M where is b is an integer equal to or greater than 1, and
generate the value m[i] for each integer i of i=1 . . . , b by dividing the value M' at every n bits.

6. The message authenticator generating apparatus according to claim 4, wherein the processing circuitry is further configured to
calculate, for each integer i of i=1, . . . , b, the sub-key L[i] using a function f taking as input the key K and an integer i.

7. The message authenticator generating apparatus according to claim 6, wherein the processing circuitry is further configured to
generate an n-bit value L using a block cipher taking as input an n-bit fixed value const[1] and the key K, and
calculate the sub-key L[i] as $(L \times x^i)$ where x is a value.

8. The message authenticator generating apparatus according to claim 1, wherein the processing circuitry is configured to
calculate the value K' by performing an exclusive OR of the value w[2] and the key K, and
calculate the authenticator T by performing an exclusive OR of the value w[3] and the value c.

9. A method for generating a message authenticator for performing block-cipher based authentication having k-bit key size and calling a block cipher only once with respect to an n-bit message block, the method comprising:
generating, for each integer i of i=1, . . . , b, an n-bit ciphertext c[i] having randomness using a block cipher function E taking as input a k-bit key K and an n-bit value m'[i] which is generated from a message M;
generating an n-bit value w[1], a k-bit value w[2], and an n-bit value w[3] each maintaining the randomness of the value c[i] using a function h taking as input the value c[i] for each integer i of i=1, . . . , b; and
generating a k-bit value K' using a function e, which is a substitution function when the key K is fixed, taking as input the value w[2] and the key K;
generating an n-bit value c using the block cipher function E taking as input the value w[1] and the k-bit value K';
generating an authenticator T using a function d, which is a substitution function when the value w[3] is fixed, taking as input the value w[3] and the value c, the authenticator T authenticating the message M.

10. A non-transitory computer readable recording medium storing a message authenticator generating program for generating a message authenticator for performing block-cipher based authentication having k-bit key size and calling a block cipher only once with respect to an n-bit message block, the program causing a computer to execute:
a randomizing process that generates, for each integer i of i=1, . . . , b, an n-bit ciphertext c[i] having randomness using a block cipher function E taking as input a k-bit key K and an n-bit value m'[i] which is generated from a message M;

a compressing process that generates an n-bit value w[1], a k-bit value w[2], and an n-bit value w[3] each maintaining the randomness of the value c[i] using a function h taking as input the value c[i] for each integer i of i=1, . . . , b; and an authenticator generating process that generates a k-bit value K' using a function e, which is a substitution function when the key K is fixed, taking as input the value w[2] and the key K, an n-bit value c using the block cipher function E taking as input the value w[1] and the value K', and a generating process that generates an authenticator T using a function d, which is a substitution function when the value w[3] is fixed with taking as input the value w[3] and the value c, the authenticator T authenticating the message M.

* * * * *